(12) United States Patent
Kwon et al.

(10) Patent No.: US 8,676,381 B2
(45) Date of Patent: Mar. 18, 2014

(54) HUMANOID ROBOT AND WALKING CONTROL METHOD THEREOF

(75) Inventors: Woong Kwon, Seongnam-si (KR); Joong Kyung Park, Suweon-si (KR); Ju Suk Lee, Suwon-si (KR); Chang Hyun Roh, Yongin-si (KR); Min Hyung Lee, Anyang-si (KR); Jae Ho Park, Suwon-si (KR); Joo Hyang Kim, Seongnam-si (KR); Ho Seong Kwak, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 347 days.

(21) Appl. No.: 13/006,782

(22) Filed: Jan. 14, 2011

(65) Prior Publication Data

US 2011/0178639 A1      Jul. 21, 2011

(30) Foreign Application Priority Data

Jan. 18, 2010   (KR) .................. 10-2010-0004285

(51) Int. Cl.
*B25J 17/00*      (2006.01)

(52) U.S. Cl.
USPC ......................................................... 700/261

(58) Field of Classification Search
USPC .............. 700/261, 245, 246, 251, 253, 260; 318/568.2, 568.1, 568.11, 568.12, 318/568.16, 632; 901/1, 9, 46
See application file for complete search history.

(56) References Cited

U.S. PATENT DOCUMENTS

| | | | |
|---|---|---|---|
| 6,992,457 B2 * | 1/2006 | Furuta et al. | 318/568.12 |
| 7,313,463 B2 * | 12/2007 | Herr et al. | 700/245 |
| 7,405,531 B2 * | 7/2008 | Khatib et al. | 318/568.11 |
| 7,657,345 B2 * | 2/2010 | Endo et al. | 700/249 |
| 7,986,118 B2 * | 7/2011 | Yoshikawa | 318/568.22 |

FOREIGN PATENT DOCUMENTS

| | | |
|---|---|---|
| EP | 1 477 283 A1 | 11/2004 |
| EP | 1 486 299 A1 | 12/2004 |
| WO | 02/069256 A2 | 9/2002 |
| WO | 03/068453 A1 | 8/2003 |

OTHER PUBLICATIONS

European Search Report dated May 4, 2011 in corresponding European Patent Application 11151201.8.

* cited by examiner

*Primary Examiner* — Dalena Tran
(74) *Attorney, Agent, or Firm* — Staas & Halsey LLP

(57) ABSTRACT

A humanoid robot that achieves stable walking based on servo control of a joint torque and a walking control method thereof. The humanoid robot calculates a joint position trajectory compensation value and a joint torque compensation value using a measurement value of a sensor, compensates for a joint position trajectory and a joint torque using the calculated compensation value, and drives a motor mounted to each joint according to the compensated joint torque.

17 Claims, 9 Drawing Sheets

HUMANOID ROBOT AND WALKING CONTROL METHOD THEREOF

CROSS-REFERENCE TO RELATED APPLICATIONS

This application claims the priority benefit of Korean Patent Application No. 10-2010-0004285, filed on Jan. 18, 2010 in the Korean Intellectual Property Office, the disclosure of which is incorporated herein by reference.

BACKGROUND

1. Field

Embodiments relate to a humanoid robot that servo-controls torque of a motor mounted to each joint to achieve stable walking and a walking control method thereof.

2. Description of the Related Art

Research into a bipedal walking robot having a joint system similar to that of a human such that the robot may easily be applied to human working and living spaces has been actively conducted.

Examples of a walking control method of such a bipedalal robot include a position-based zero moment point (ZMP) walking control method, a torque-based dynamic walking control method, and a finite state machine (FSM) walking control method.

In the ZMP-based walking control method, a walking direction, a stride width, a walking rate and the like are preset, a walking pattern of feet and a body corresponding to the preset items is created using ZMP constraint conditions, and a joint position trajectory of each leg is calculated by inverse kinematic calculation of the walking pattern. Also, the ZMP-based walking control method is implemented by position servo control to enable joints of each leg to follow the calculated joint position trajectory. During walking, joints of each leg are controlled to accurately follow the joint position trajectory obtained from the walking pattern.

In the ZMP-based walking control method, the robot continues to bend its knees while walking such that kinematic singularity is avoided when calculating the angle of each joint through inverse kinematics. As a result, the robot may unnaturally walk unlike a human.

In the ZMP-based walking control method, the position of each joint may be accurately controlled to control the ZMP, and therefore, a position servo control gain is high. As a result, current of the motor is high, and therefore, energy efficiency is low. Also, rigidity of each joint is increased, and therefore, each joint may apply great impact to obstacles when colliding with the obstacles.

In the FSM-based walking control method, operation states (indicating the states of the FSM) of the walking robot are preset, and torque of each joint is calculated by referring to the operation states during walking, such that the robot walks appropriately.

In the FSM-based walking control method, the robot may take various poses by changing the operation state during walking. However, since each pose is taken in a restricted operation state, a separate operation to maintain balance of the robot is performed regardless of a walking operation to perform a task. A representative example of the balancing operation is a step motion in which the robot stamps its feet. Time is delayed and energy is wasted due to such operation.

The humanoid robot may be considered to interact with surroundings to apply FSM-based walking to the humanoid robot, such as a bipedal robot, which has difficulty in balancing as compared with a quadrupedal robot. That is, the operation state of the robot is fed back according to the surroundings to control the walking operation of the robot.

SUMMARY

It is an aspect to provide a humanoid robot that servo-controls torque of a motor mounted to each joint during finite state machine (FSM)-based walking control to achieve stable walking and a walking control method thereof.

Additional aspects of the invention will be set forth in part in the description which follows and, in part, will be obvious from the description, or may be learned by practice of the invention.

In accordance with one aspect, a humanoid robot includes a robot joint unit including joints movable during walking of the robot, a sensor unit to measure landing information and pose information of the robot, a joint position trajectory creation unit to create a joint position trajectory of each joint using the landing information and the pose information of the robot, a joint position trajectory compensation value calculation unit to calculate a joint position trajectory compensation value to compensate for the joint position trajectory of each joint, a joint torque calculation unit to compensate for the joint position trajectory of each joint using the joint position trajectory compensation value and to calculate a joint torque of each joint according to the compensated joint position trajectory of each joint, a joint torque compensation value calculation unit to calculate a joint torque compensation value to compensate for the joint torque of each joint, and a joint torque servo control unit to compensate for a joint torque command of each joint using the joint torque compensation value, to calculate motor current to follow the compensated joint torque command of each joint, and to servo-control torque of a motor mounted to each joint according to the calculated motor current.

The sensor unit may include a multi-axis force and torque (F/T) sensor to measure landing of the robot and a pose sensor to measure pose of the robot.

The joint position trajectory creation unit may include a plurality of state machines alternately operating when a left foot or a right foot lands on a ground and a joint position trajectory calculator to determine landing of the left foot or the right foot according to switching between the state machines to calculate a joint position trajectory command of each joint.

The joint torque calculation unit, which may include first to third position operators, a proportional gain controller, and a derivative gain controller, may calculate a joint torque command $\tau_d$ of each joint as represented by Equation 1, $$\tau_d = k_p(\theta_d - \theta) + k_d(\dot{\theta}_d - \dot{\theta}) + \tau_{ff} \qquad \text{Equation 1}$$

the first position operator may output a subtracted value $\theta_d - \theta$ obtained by subtracting a current joint position $\theta$ fed back from the motor from a joint position trajectory command $\theta_d$ the proportional gain controller may output a multiplied value $k_p(\theta_d - \theta)$ obtained by multiplying the subtracted value $\theta_d - \theta$ by a proportional gain $k_p$ to the second position operator, the third position operator may output a subtracted value $\dot{\theta}_d - \dot{\theta}$ obtained by subtracting a derived current joint position $\dot{\theta}$ from a derived joint position trajectory command $\dot{\theta}_d$ to the derivative gain controller, the derivative gain controller may output a multiplied value $k_d(\dot{\theta}_d - \dot{\theta})$ obtained by multiplying the subtracted value $\dot{\theta}_d - \dot{\theta}$ by a derivative gain $k_d$ to the second position operator, and the second position operator may add a feed-forward parameter $\tau_{ff}$ previously calculated using inverse dynamics to the multiplied values $k_p(\theta_d - \theta)$ and $k_d(\dot{\theta}_d - \dot{\theta})$ to output the joint torque command $\tau_d$ of each joint.

The sensor unit may further include an encoder mounted to the motor to measure the current joint position. θ

The joint torque servo control unit may include a motor controller and a torque sensor to measure torque of the motor, and the motor controller may control the motor to be driven such that the motor follows the joint torque command of each joint when a joint torque value measured by the torque sensor is fed back to the motor controller.

The motor controller, which may include first to third torque operators, a proportional gain controller, an integrator, a integral gain controller, and a derivative gain controller, may calculate motor current i as represented by Equation 2, $$i = k_p(\tau_d - \tau) + k_d(\dot{\tau}_d - \dot{\tau}) + k_i \int (\tau_d - \tau) dt + i_{ff} \quad \text{Equation 2}$$

the first torque operator may output a subtracted value $\tau_d - \tau$ obtained by subtracting a current motor torque τ fed back from the torque sensor from a joint torque command $\tau_d$, the proportional gain controller may output a multiplied value $k_p(\tau_d - \tau)$ obtained by multiplying the subtracted value $\tau_d - \tau$ by a proportional gain $k_p$ to the second torque operator, the integrator may integrate and output the subtracted value $\tau_d - \tau$ to the integral gain controller, the integral gain controller may output a multiplied value $k_i \int (\tau_d - \tau)$ obtained by multiplying the integrated subtracted value $\int (\tau_d - \tau)$ by an integral gain $k_i$ to the second torque operator, the third torque operator may output a subtracted value $\dot{\tau}_d - \dot{\tau}$ obtained by subtracting a derived current motor torque $\dot{\tau}$ from a derived joint torque command $\dot{\tau}_d$ to the derivative gain controller, the derivative gain controller may output a multiplied value $k_d(\dot{\tau}_d - \dot{\tau})$ obtained by multiplying the subtracted value $\dot{\tau}_d - \dot{\tau}$ by a derivative gain $k_d$ to the second torque operator, and the second torque operator may add a feed-forward parameter $i_{ff}$ previously calculated using inverse dynamics to the multiplied values $k_p(\tau_d - \tau)$, $k_d(\dot{\tau}_d - \dot{\tau})$ and $k_i \int (\tau_d - \tau)$ to output the motor current i.

The sensor unit may include a multi-axis F/T sensor to measure landing of the robot and a pose sensor to measure pose of the robot, the joint position trajectory compensation value calculation unit may calculate a joint position trajectory compensation value h based on force and moment information received from the multi-axis F/T sensor and pose information of the robot received from the pose sensor when a foot of the robot lands on a ground, and the joint torque calculation unit may calculate a joint torque according to a joint position trajectory command $\theta_d$ compensated for as represented by Equation 3 using the joint position trajectory compensation value h.

$$\theta_d = \theta_{d0} + h(x, f, m, ZMP, \phi) \quad \text{Equation 3}$$

Where, $\theta_{d0}$ is an original joint position trajectory command, and the joint position trajectory compensation value h is calculated from a function of one selected from various parameters including center of gravity x of the robot, force f with respect to the ground, moment m with respect to the ground, zero moment point ZMP of the robot, and inclination angle φ of the robot.

The joint position trajectory compensation value may be calculated as represented by Equation 4.

$$h(x) = k_{px}(x_d - x) + k_{dx}(\dot{x}_d - \dot{x}) \quad \text{Equation 4}$$

Where, $x_d$ is a command value of the center of gravity of the robot, x is an actual value of the center of gravity of the robot, $k_{px}$ is a proportional gain, $\dot{x}_d$ is a velocity of the center of gravity of the robot, $\dot{x}$ is an actual value of the velocity of the center of gravity of the robot, and $k_{dx}$ is a derivative gain.

The sensor unit may include a multi-axis F/T sensor to measure landing of the robot and a pose sensor to measure pose of the robot, the joint torque compensation value calculation unit may calculate a joint torque compensation value g based on force and moment information received from the multi-axis F/T sensor and pose information of the robot received from the pose sensor when a foot of the robot lands on a ground, and the joint torque servo control unit may calculate a joint torque according to a joint torque command $\tau_d$ compensated for as represented by Equation 5.

$$\tau_d = \tau_{d0} + g(x, f, m, ZMP, \phi) \quad \text{Equation 5}$$

Where, $\tau_{d0}$ is an original joint torque command, and the joint torque compensation value g is calculated from a function of one selected from various parameters including center of gravity x of the robot, force f with respect to the ground, moment m with respect to the ground, zero moment point ZMP of the robot, and inclination angle φ of the robot.

The joint torque compensation value may be calculated as represented by Equation 6.

$$g(x) = k'_{px}(x_d - x) + k'_{dx}(\dot{x}_d - \dot{x}) \quad \text{Equation 6}$$

Where, $x_d$ is a command value of the center of gravity of the robot, x is an actual value of the center of gravity of the robot, $k'_{px}$ is a proportional gain, $\dot{x}_d$ is a velocity of the center of gravity of the robot, $\dot{x}$ is an actual value of the velocity of the center of gravity of the robot, and $k'_{dx}$ is a derivative gain.

In accordance with another aspect, a walking control method of a humanoid robot includes calculating a joint position trajectory of each joint to perform walking of the robot, calculating a joint position trajectory compensation value to compensate for the joint position trajectory of each joint using landing information and pose information of the robot measured by a sensor unit mounted in the robot, calculating a joint torque of each joint according to the joint position trajectory compensated for using the joint position trajectory compensation value, calculating a joint torque compensation value to compensate for the joint torque of each joint using the landing information and the pose information of the robot measured by the sensor unit mounted in the robot, and calculating motor current to follow the joint torque command compensated for using the joint torque compensation value and servo-controlling torque of a motor mounted to each joint according to the calculated motor current.

Calculating the joint position trajectory may include determining landing of a left foot or a right foot on a ground to calculate a joint position trajectory command of each joint.

Calculating the joint torque of each joint may include outputting a subtracted value $\theta_d - \theta$ obtained by subtracting a current joint position θ from a joint position trajectory command $\theta_d$ of each joint, outputting a multiplied value $k_p(\theta_d - \theta)$ obtained by multiplying the subtracted value $\theta_d - \theta$ by a proportional gain $k_p$, outputting a subtracted value $\dot{\theta}_d - \dot{\theta}$ obtained by subtracting a derived current joint position $\dot{\theta}$ from a derived joint position trajectory command $\dot{\theta}_d$, outputting a multiplied value $k_p(\dot{\theta}_d - \dot{\theta})$ obtained by multiplying the subtracted value $\dot{\theta}_d - \dot{\theta}$ by a derivative gain $k_d$, and adding a feed-forward parameter $\tau_{ff}$ previously calculated using inverse dynamics to the multiplied values $k_p(\theta_d - \theta)$ and $k_d(\dot{\theta}_d - \dot{\theta})$ to output a joint torque command $\tau_d$ of each joint.

Calculating the motor current may include outputting a subtracted value $\tau_d - \tau$ obtained by subtracting a current motor torque τ from a joint torque command $\tau_d$, outputting a multiplied value $k_p(\tau_d - \tau)$ obtained by multiplying the subtracted value $\tau_d - \tau$ by a proportional gain $k_p$, integrating the subtracted value $\tau_d - \tau$, outputting a multiplied value $k_i \int (\tau_d - \tau)$ obtained by multiplying the integrated subtracted value $\int (\tau_d - \tau)$ by an integral gain $k_i$, outputting a subtracted value $\dot{\tau}_d - \dot{\tau}$ obtained by subtracting a derived current motor torque $\dot{\tau}$ from a derived joint torque command $\dot{\tau}_d$, outputting a multiplied value $k_d(\dot{\tau}_d-\dot{\tau})$ obtained by multiplying the subtracted value $\dot{\tau}_d-\dot{\tau}$ by a derivative gain $k_d$, and adding a feed-forward parameter $i_{ff}$ previously calculated using inverse dynamics to the multiplied values $k_p(\tau_d-\tau)$, $k_d(\dot{\tau}_d-\dot{\tau})$ and $k_i\int(\tau_d-\tau)$ to output motor current i.

The walking control method may further include calculating the joint position trajectory compensation value based on force and moment information received from a multi-axis F/T sensor to measure landing of the robot and pose information of the robot received from a pose sensor to measure pose of the robot, the joint position trajectory compensation value h may be calculated from a function of one selected from various parameters including center of gravity x of the robot, force f with respect to the ground, moment m with respect to the ground, zero moment point ZMP of the robot, and inclination angle $\phi$ of the robot, and the compensated joint position trajectory command $\theta_d$ may be obtained by adding the calculated joint position trajectory compensation value h to an original joint position trajectory command $\theta_{d0}$.

The walking control method may further include calculating the joint torque compensation value based on force and moment information received from a multi-axis F/T sensor to measure landing of the robot and pose information of the robot received from a pose sensor to measure pose of the robot, the joint torque compensation value g may be calculated from a function of one selected from various parameters including center of gravity x of the robot, force f with respect to the ground, moment m with respect to the ground, zero moment point ZMP of the robot, and inclination angle $\phi$ of the robot, and the compensated joint torque command $\tau_d$ may be obtained by adding the calculated joint torque compensation value g to an original joint torque command $\tau_{d0}$.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
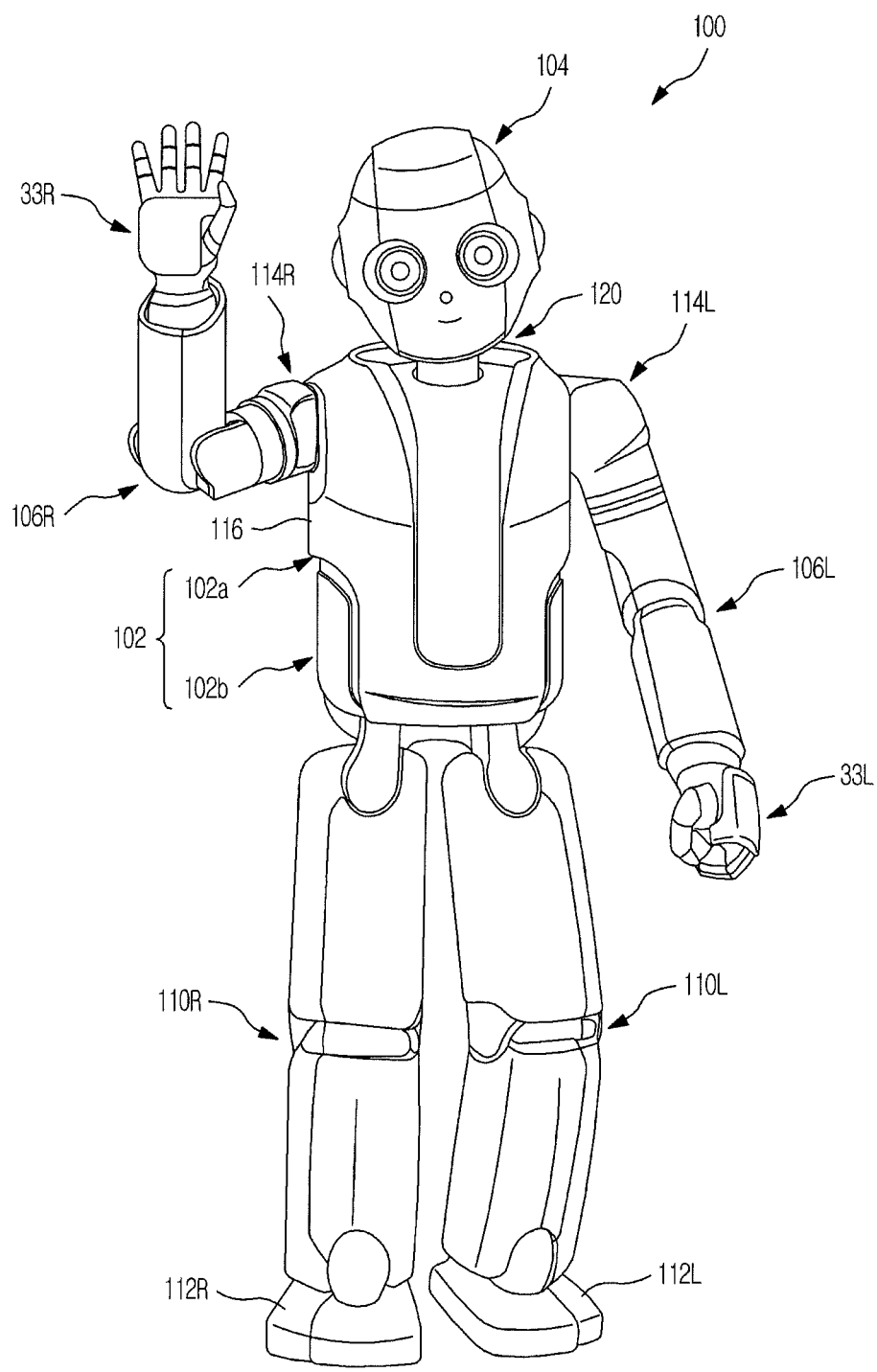
FIG. 1 is a view illustrating the external appearance of a humanoid robot according to an embodiment.

Reference will now be made in detail to the embodiments, examples of which are illustrated in the accompanying drawings, wherein like reference numerals refer to like elements throughout.

As shown in FIG. 1, a head 104 is connected to the upper part of an upper body 102 of a humanoid robot 100 via a neck 120, for example. Two arms 106L and 106R may be connected to opposite sides of the upper part of the upper body 102 via shoulders 114L and 114R, respectively. Hands 33L and 33R may be connected to respective ends of the arms 106L and 106R. Two legs 110L and 110R may be connected to opposite sides of the lower part of the upper body 102, respectively. Feet 112L and 112R may be connected to respective ends of the legs 110L and 110R.

The head 104, the arms 106L and 106R, the legs 110L and 110R, the hands 33L and 33R, and the feet 112L and 112R have predetermined degrees of freedom through respective joints. The interior of the upper body 102 is protected by a cover 116. In reference numerals, "R" and "L" denote the right and left of the robot 100, respectively.

Figure 2:
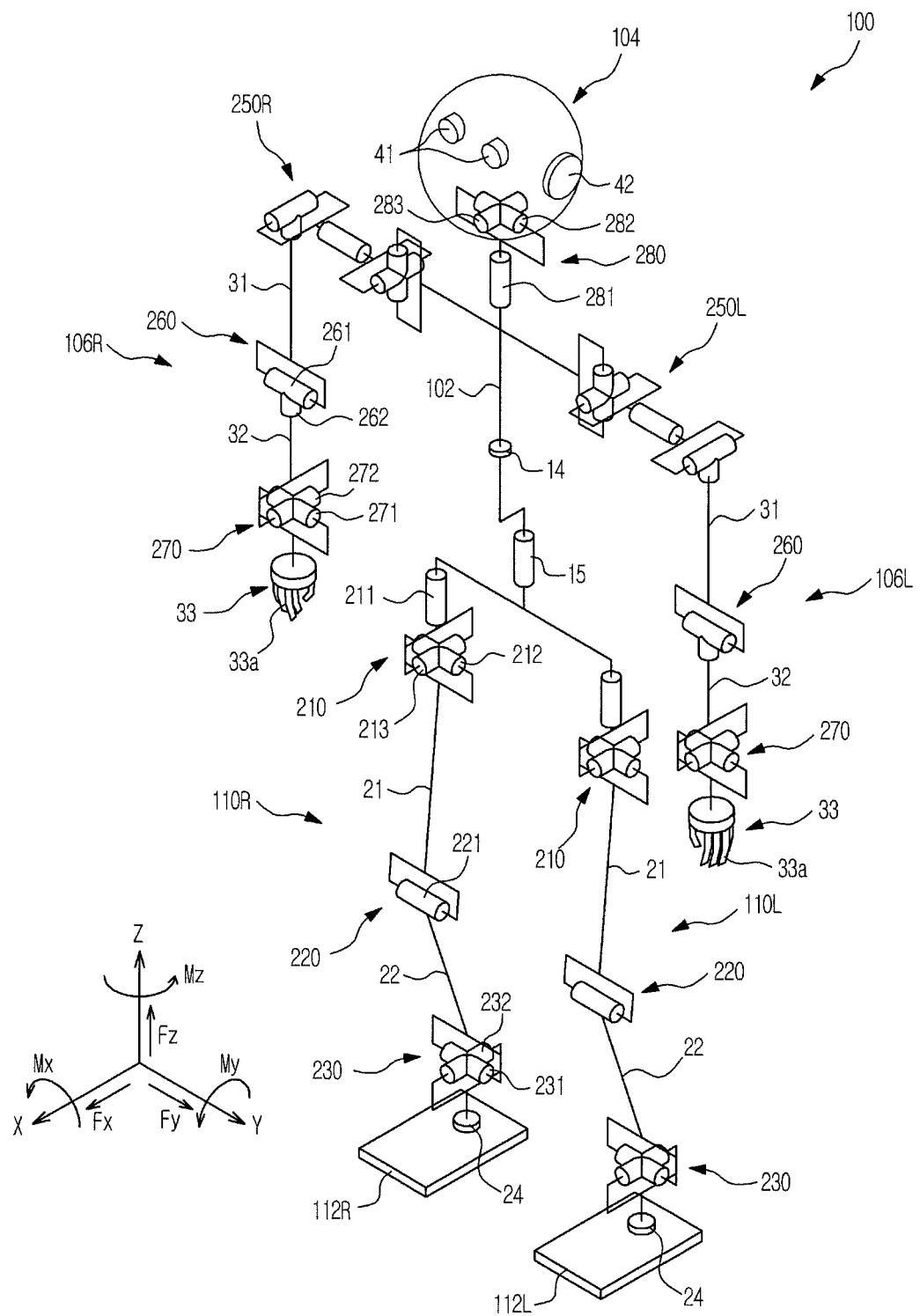
FIG. 2 is a view illustrating a joint structure of the humanoid robot of FIG. 1.

FIG. 2 is a view illustrating a joint structure of the humanoid robot shown in FIG. 1. As shown in FIG. 2, each of the legs 110L and 110R of the humanoid robot 100 has a thighbone link 21, a fibula link 22, and a corresponding one of the feet 112L and 112R. The thighbone link 21 is connected to the upper body 102 via a hip joint unit 210. The thighbone link 21 and the fibula link 22 are connected to each other via a knee joint unit 220, and the fibula link 22 and the foot 112L or 112R are connected to each other through an ankle joint unit 230.

The hip joint unit 210 may have three degrees of freedom. Specifically, the hip joint unit 210 includes a rotation joint 211 of a yaw direction (Z-axis rotation), a rotation joint 212 of a pitch direction (Y-axis rotation), and a rotation joint 213 of a roll direction (X-axis rotation).

The knee joint unit 220 includes a rotation joint 221 of a pitch direction. That is, the knee joint unit 220 may have one degree of freedom. The ankle joint unit 230 includes a rotation joint 231 of a pitch direction and a rotation joint 232 of a roll direction. That is, the ankle joint unit 230 has two degrees of freedom.

Each of the legs 110L and 110R includes six rotation joints with respect to three joint units 210, 220 and 230. Consequently, the two legs 110L and 110R include a total of 12 rotation joints.

A multi-axis force and torque (F/T) sensor 24 is mounted between the foot 112L or 112R and the ankle joint unit 230 of each of the legs 110L and 110R. The multi-axis F/T sensor 24 measures three-directional components Fx, Fy and Fz of force transferred from the foot 112L or 112R and three-directional components Mx, My and Mz of moment to detect landing of the foot 112L or 112R and load applied to the foot 112L or 112R.

Cameras 41 to photograph surroundings and a microphone 42 to receive user voice are mounted in the head 104.

The head 104 is connected to the upper body 102 via a neck joint unit 280. The neck joint unit 280 includes a rotation joint 281 of a yaw direction, a rotation joint 282 of a pitch direction, and a rotation joint 283 of a roll direction. That is, the neck joint unit 280 has three degrees of freedom.

Head rotation motors (not shown) are connected to the rotation joints 281, 282 and 283 of the neck joint unit 280.

Shoulder joint assemblies 250L and 250R are mounted to opposite sides of the upper body 102 to connect the arms 106L and 106R to the upper body 102.

Each of the arms 106L and 106R has a humerus link 31, a forearm bone link 32, and a hand 33. The humerus link 31 is connected to the upper body 102 via the shoulder joint assemblies 250L or 250R. The humerus link 31 and the forearm bone link 32 are connected to each other via an elbow joint unit 260, and the forearm bone link 32 and the hand 33 are connected to each other link a wrist joint unit 270.

The elbow joint unit 260 includes a rotation joint 261 of a pitch direction and a rotation joint 262 of a yaw direction. That is, the elbow joint unit 260 may have two degrees of freedom. The wrist joint unit 270 includes a rotation joint 271 of a pitch direction and a rotation joint 272 of a roll direction. That is, the wrist joint unit 270 may have two degrees of freedom.

The hand 33 includes five fingers 33a. A plurality of joints (not shown) driven by motors may be provided in the hand 33. The fingers 33a perform various operations such as grasping an object or indication of a specific direction in interlock with motion of the arm 106.

A pose sensor 14 is mounted in the upper body 14. The pose sensor 14 senses an inclination angle of the upper body 102 relative to a perpendicular axis and an angular speed of the upper body 102 to create pose information. The pose sensor 14 may be mounted in the head 104 in addition to the upper body 102. Also, a rotation joint 15 of a yaw direction is mounted between a chest 102a and a waist 102b constituting the upper body 102 such that the chest 102a rotates relative to the waist 102b.

Actuators, such as motors 405 (see FIG. 6), to drive the rotation joints are mounted in the humanoid robot 100. The motors 405 are adequately controlled to perform various operations of the humanoid robot 100.

Figure 3:
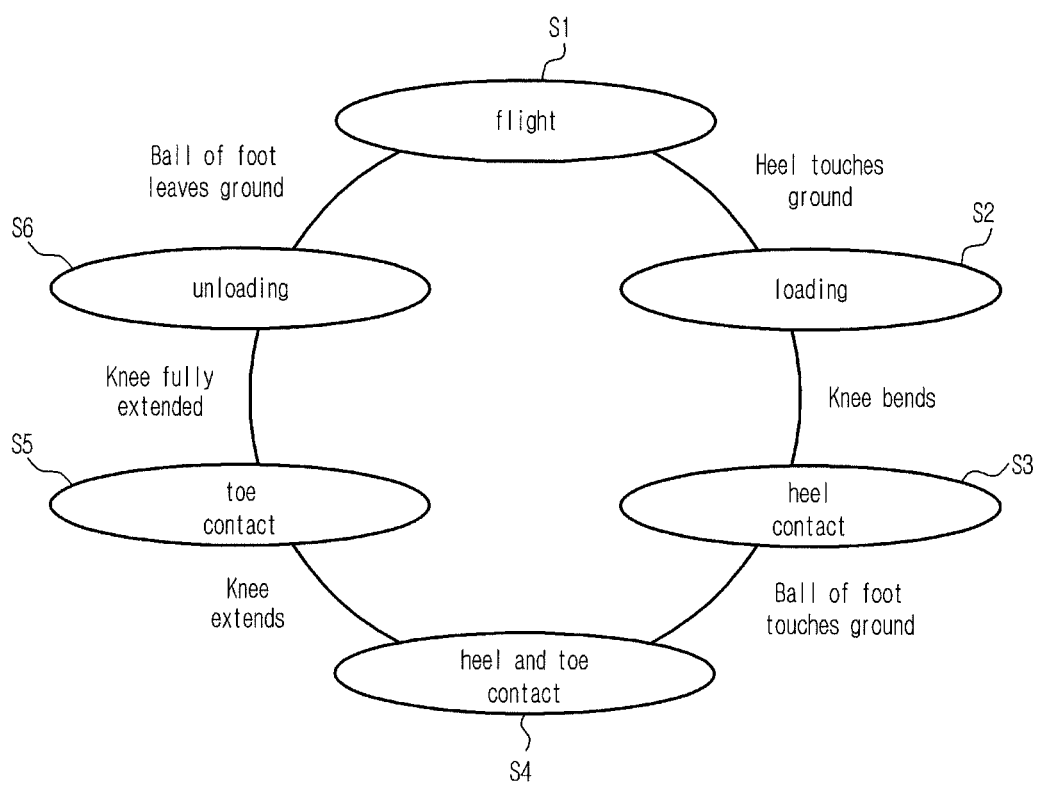
FIG. 3 is a view illustrating a robot operation state and control operation applied during finite state machine (FSM)-based walking according to an embodiment.

In a finite state machine (FSM)-based walking control method, the robot may have six predetermined operation states S1, S2, S3, S4, S5 and S6, as shown in FIG. 3. The respective operation states refer to poses which the robot assumes during walking.

The first operation state S1 (flight) denotes a pose in which one leg swings, the second operation state S2 (loading) denotes a pose in which one foot is placed down on the ground, the third operation state S3 (heel contact) denotes a pose in which the heel of one foot touches the ground, the fourth operation state S4 (heel and toe contact) denotes a pose in which the heel and the toe of one foot simultaneously touch the ground, the fifth state S5 (toe contact) denotes a pose in which the toe of one foot touches the ground, and the sixth operation state S6 (unloading) denotes a pose in which one foot is taken off the ground.

Figure 4:
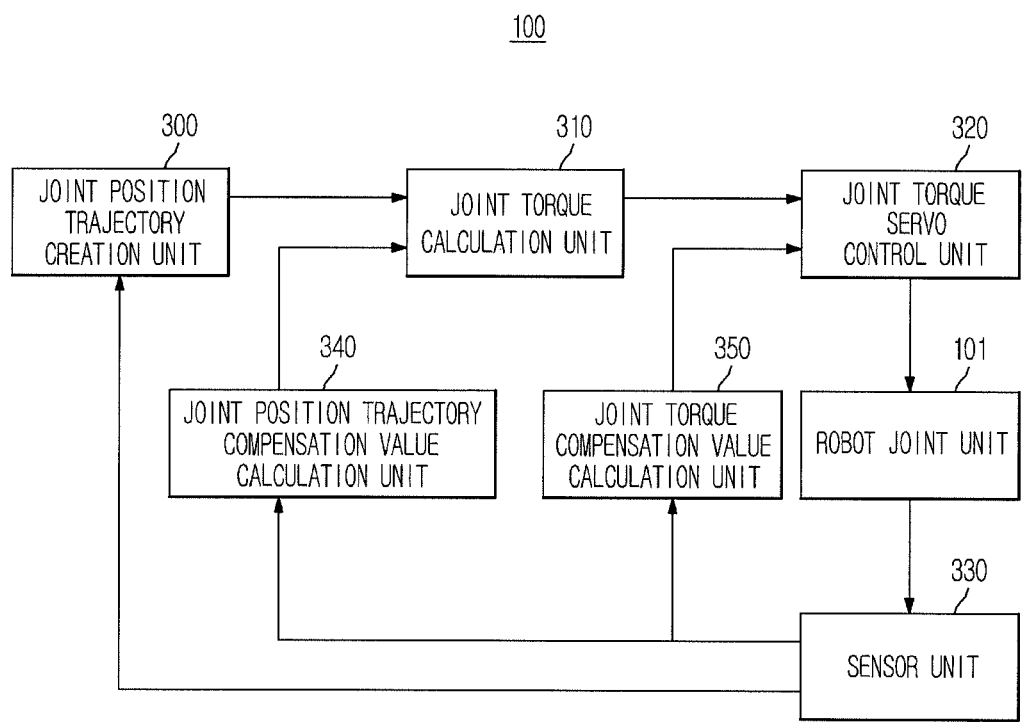
FIG. 4 is a control block diagram of a humanoid robot according to an embodiment.
Figure 5:
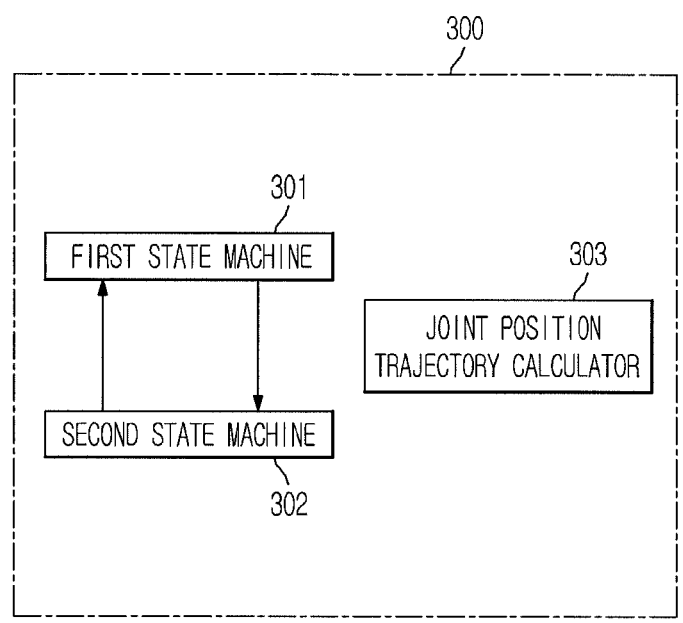
FIG. 5 is a detailed construction view of a joint position trajectory creation unit of FIG. 4.

FIG. 4 illustrates a humanoid robot according to an embodiment, and FIG. 5 illustrates a joint position trajectory creation unit of FIG. 4.

As shown in FIG. 4, a humanoid robot 100 includes a joint position trajectory creation unit 300, a joint torque calculation unit 310, a joint torque servo control unit 320, a robot joint unit 101, a sensor unit 330, a joint position trajectory compensation value calculation unit 340, and a joint torque compensation value calculation unit 350.

The robot joint unit 101 may include a total of 12 rotation joints constituting hip joint units 210, knee joint units 220, and ankle joint units 230 of two legs 110L and 110R for robot walking. The robot joint unit 101 does not include joints belonging to two legs but may include all joints of the humanoid robot 100 including an upper body and arms for stable walking.

Figure 6:
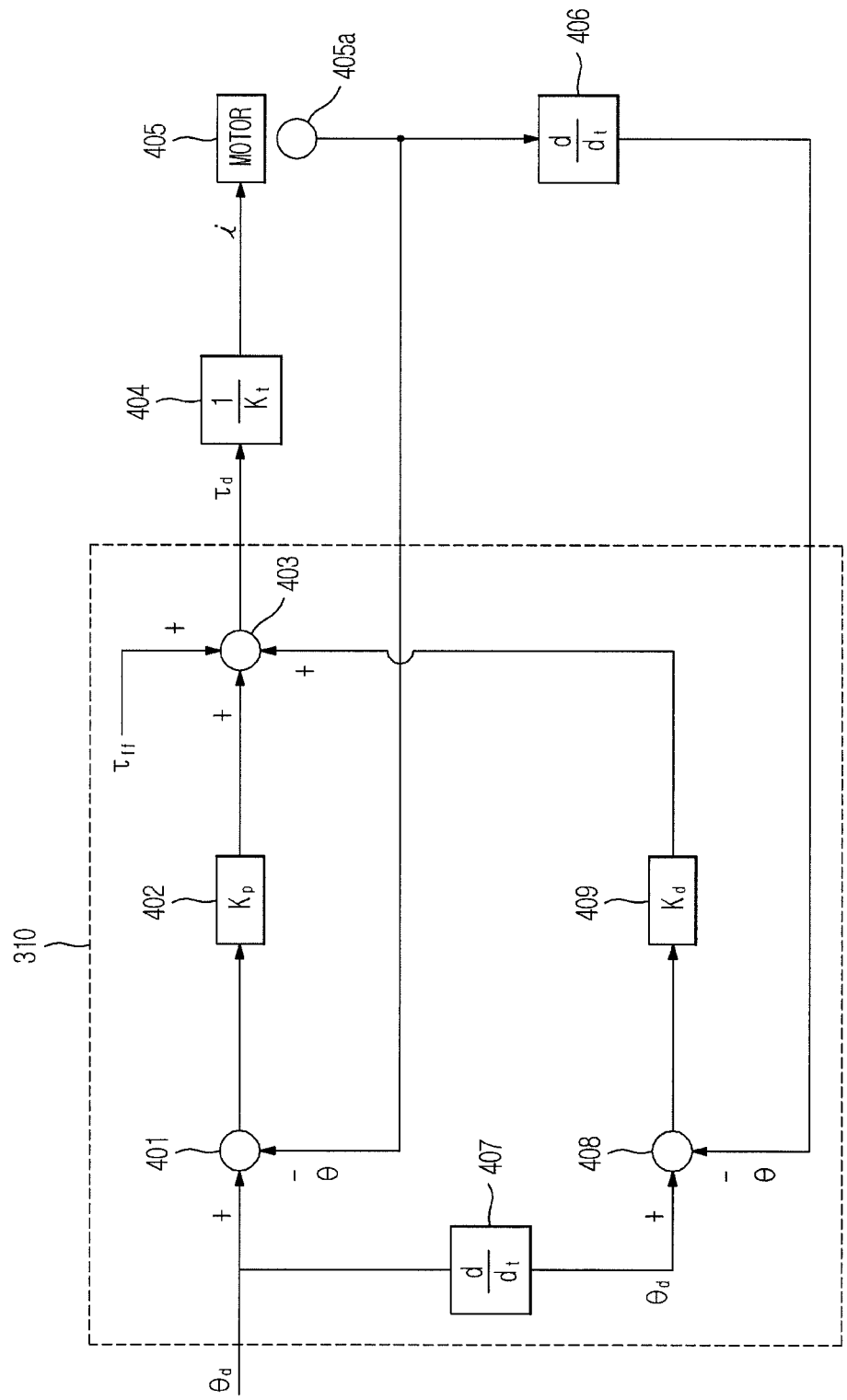
FIG. 6 is a block diagram illustrating the operation of driving a motor according to a joint torque command calculated using a joint position trajectory command according to an embodiment.
Figure 8:
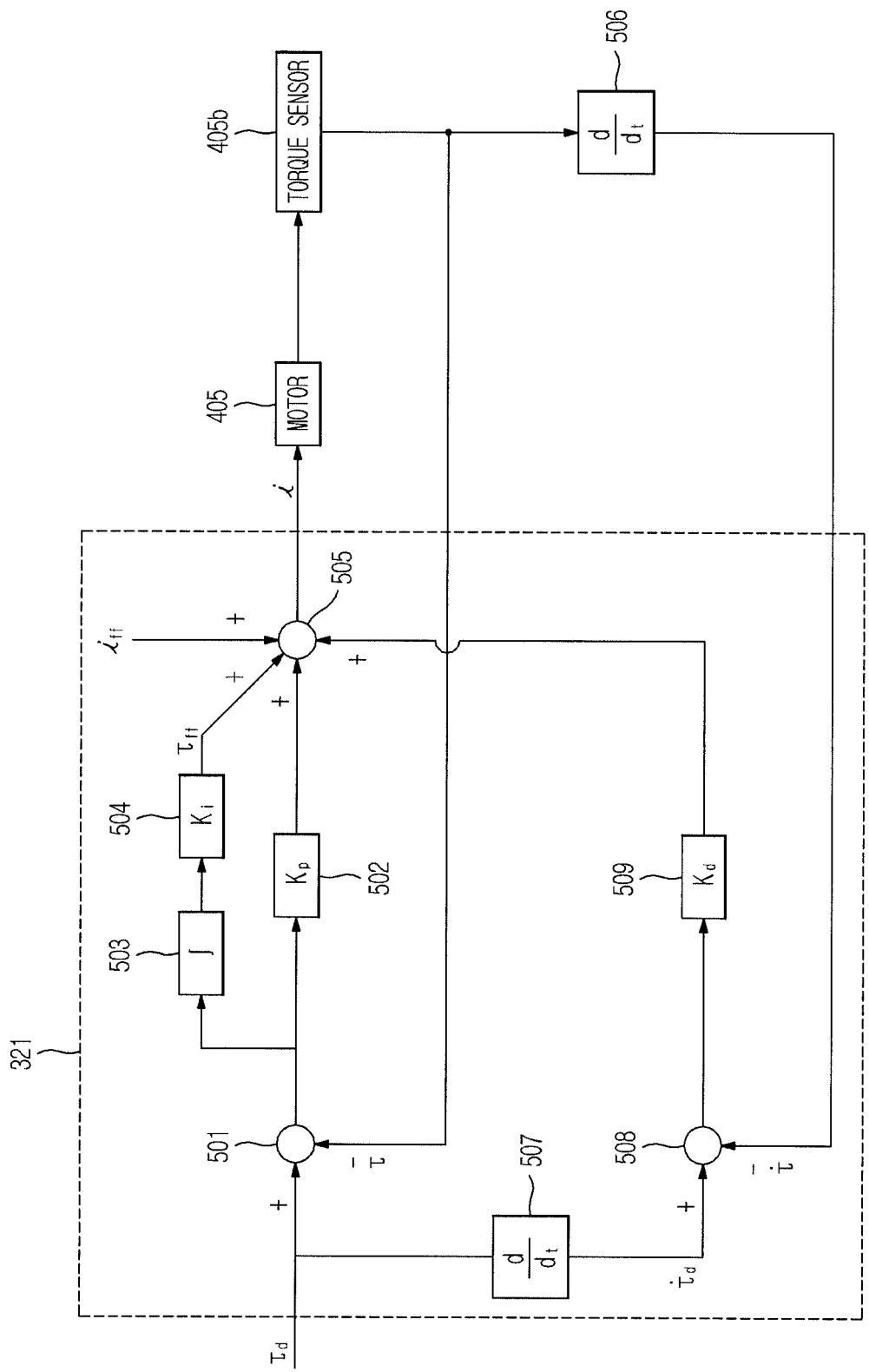
FIG. 8 is a block diagram illustrating the operation of servo-controlling a motor driven according to a joint torque command according to an embodiment.

The sensor unit 330 includes a pose sensor 14 mounted in the upper body 102, a multi-axis F/T sensor 24 mounted to each of the ankle joint units 230 shown in FIG. 2, and an encoder 405b shown in FIG. 8 to measure rotation of a motor 405 shown in FIG. 6 mounted to each joint of the robot joint unit 101.

The joint position trajectory creation unit 300 creates a joint position trajectory command $\theta_d$ of each joint using a measurement value of the sensor unit 330.

In FIG. 5, the joint position trajectory creation unit 300 includes a first state machine 301, a second state machine 302, and a joint position trajectory calculator 303.

The first state machine 301 and the second state machine 302 alternately operate according to a landing signal of the F/T sensor 24 mounted to the ankle joint unit 230 when the right foot or the left foot lands on the ground. When the left foot swings while the right foot is in a landing state, switching is performed from the second state machine 302 to the first state machine 301. When the right foot swings while the left foot is in the landing state, switching is performed from the first state machine 301 to the second state machine 302.

The joint position trajectory calculator 303 determines landing of the left foot and the right foot according switching between the first state machine 301 and the second state machine 302 to calculate a joint position trajectory command $\theta_d$ of each joint of the robot joint unit 101.

As another example to create the joint position trajectory command $\theta_d$, motion of a human may be captured, motion of each joint may be sampled in a cycle, and joint positions of the humanoid robot are matched based on the sampling information to calculate the joint position trajectory command.

The joint torque calculation unit 310 calculates a joint torque command $\tau_d$ of each joint using the joint position trajectory command $\theta_d$ of each joint.

FIG. 6 illustrates the operation of driving a motor according to a joint torque command calculated using a joint position trajectory command according to an embodiment.

In FIG. 6, a first position operator 401 outputs a subtracted value $\theta_d-\theta$ obtained by subtracting a current joint position $\theta$ fed back from a motor 405 from a joint position trajectory command $\theta_d$ to a proportional gain controller 402. The current joint position $\theta$ may be measured by an encoder 405a mounted to the motor 405.

The proportional gain controller 402 outputs a multiplied value $k_p(\theta_d-\theta)$ obtained by multiplying the subtracted value $\theta_d-\theta$ by a proportional gain $k_p$ to a second position operator 403.

A third position operator 408 outputs a subtracted value $\dot{\theta}_d-\dot{\theta}$ obtained by subtracting a current joint position $\dot{\theta}$ derived by a derivative controller 406 from a joint position trajectory command $\dot{\theta}_d$ derived by a derivative controller 407 to a derivative gain controller 409. The derivative gain controller 409 outputs a multiplied value $k_d(\dot{\theta}_d-\dot{\theta})$ obtained by multiplying the subtracted value $\dot{\theta}_d-\dot{\theta}$ by a derivative gain $k_d$ to the second position operator 403.

The second position operator 403 adds a feed-forward parameter $\tau_{ff}$ previously calculated using inverse dynamics to the multiplied values $k_p(\theta_d-\theta)$ and $k_d(\dot{\theta}_d-\dot{\theta})$ and outputs an added value $\tau_d$. The added value $\tau_d$ is a joint torque command $\tau_d$ of each joint calculated by the joint torque calculation unit 310. An example of the added value $\tau_d$ may be represented by Equation 1.

$$\tau_d = k_p(\theta_d-\theta) + k_d(\dot{\theta}_d-\dot{\theta}) + \tau_{ff} \quad \text{Equation 1}$$

Equation 1 uses a proportional derivative (PD) controller and a feed-forward (FF) controller, to which, however, Equation 1 is not limited. Equation 1 may use any controllers to control a joint position $\theta$ of each joint to follow a joint position trajectory command $\theta_d$. In Equation 1, the proportional gain, derivative gain, and the feed-forward parameter may be obtained through repetitive tuning for stable walking.

The joint torque command $\tau_d$ is multiplied by a motor torque constant $1/K_t$ by an attenuation controller 404 to obtain a multiplied value, which is motor current i, and the motor 405 mounted to each joint of the robot joint unit 101 is driven according to the motor current i. At this time, the joint torque command $\tau_d$ of each joint calculated by the joint torque calculation unit 310 is provided to the joint torque servo control unit 320.

Figure 7:
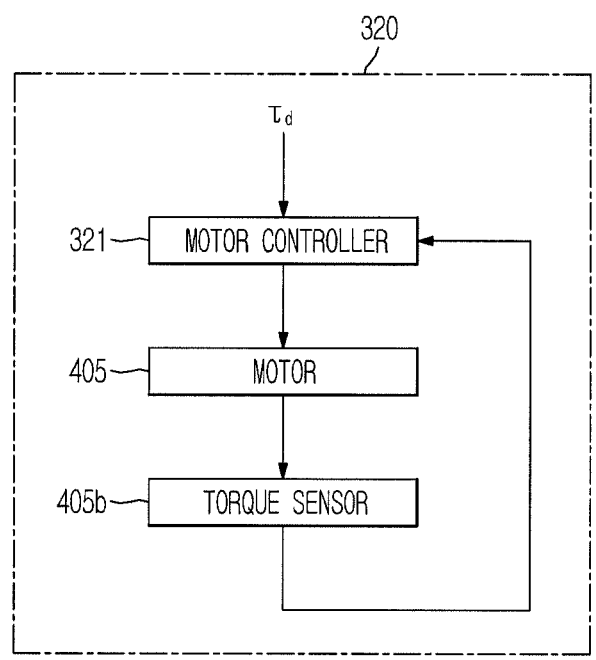
FIG. 7 is a detailed construction view of a joint torque servo control unit of FIG. 4.

In FIG. 7, the joint torque servo control unit 320 includes a motor controller 321. When a joint torque value measured by the torque sensor 405*b* is fed back, the motor controller 321 controls the motor 405 to be driven such that the motor 405 follows the joint torque command $\tau_d$. At this time, the motor controller 321 is not limited to the construction in which the joint torque value measured by the torque sensor 405*b* is fed back to the motor controller 321. For example, the motor controller 321 may use a joint torque value estimated from current measured by a current sensor to measure current of the motor 405.

FIG. 8 is a block diagram illustrating the operation of servo-controlling a motor driven according to a joint torque command according to an embodiment.

In FIG. 8, a first torque operator 501 outputs a subtracted value $\tau_d - \tau$ obtained by subtracting a current motor torque $\tau$ fed back from the torque sensor 405*b* from a joint torque command $\tau_d$ of each joint to a proportional gain controller 502. The proportional gain controller 502 outputs a multiplied value $k_p(\tau_d - \tau)$ obtained by multiplying the subtracted value by a proportional gain $k_p$ to a second torque operator 505.

An integrator 503 integrates and outputs the subtracted value $\tau_d - \tau$ to an integral gain controller 504. The integral gain controller 504 outputs a multiplied value $k_i \int (\tau_d - \tau)$ obtained by multiplying the integrated subtracted value $\int (\tau_d - \tau)$ by an integral gain $k_i$ to the second torque operator 505.

A third torque operator 508 outputs a subtracted value $\dot{\tau}_d - \dot{\tau}$ obtained by subtracting a current motor torque $\dot{\tau}$ derived by a derivative controller 506 from a joint torque command $\dot{\tau}_d$ derived by a derivative controller 507 to a derivative gain controller 509. The derivative gain controller 509 outputs a multiplied value $k_d(\dot{\tau}_d - \dot{\tau})$ obtained by multiplying the subtracted value $\dot{\tau}_d - \dot{\tau}$ by a derivative gain $k_d$ to the second torque operator 505.

The second torque operator 505 adds a feed-forward parameter $i_{ff}$ previously calculated using inverse dynamics to the multiplied values $k_p(\tau_d - \tau)$, $k_d(\dot{\tau}_d - \dot{\tau})$ and $k_i \int (\tau_d - \tau)$, and outputs an added value. The added value is motor current i applied to the motor 405. An example of the motor current i may be represented by Equation 2.

$$i = k_p(\tau_d - \tau) + k_d(\dot{\tau}_d - \dot{\tau}) + k_i \int (\tau_d - \tau) dt + i_{ff} \qquad \text{Equation 2}$$

Equation 2 uses a proportional integral derivative (PID) controller and a feed-forward (FF) controller, to which, however, Equation 2 is not limited. Equation 2 may use any controllers to control a joint position θ of each joint to follow a joint position trajectory command $\theta_d$. In Equation 2, the proportional gain, the derivative gain, the integral gain, and the feed-forward parameter may be obtained through repetitive tuning for stable walking.

When the robot walks after pose change, walking control may be improperly performed depending upon surrounding conditions, such as the state of walking surface and the appearance of an obstacle, with the result that the robot may lose balance. Therefore, information interacting with the surrounding conditions and pose information may be fed back to the humanoid robot, which compensates for a joint position trajectory command or a joint torque command to stably control walking.

In FIG. 4, the joint position trajectory compensation value calculation unit 340 creates a joint position trajectory compensation value to compensate for a joint position trajectory command using a value measured by the sensor unit 330 and provides the created joint position trajectory compensation value to the joint torque calculation unit 310. That is, when a foot of the robot lands on a ground, the joint position trajectory compensation value calculation unit 340 may calculate a joint position trajectory compensation value h based on force and moment information received from the multi-axis F/T sensor 24 and pose information of the robot received from the pose sensor 14.

The joint torque calculation unit 310 may calculate a joint torque according to a joint position trajectory command $\theta_d$ compensated for as represented by Equation 3.

$$\theta_d = \theta_{d0} + h(x, f, m, ZMP, \phi) \qquad \text{Equation 3}$$

Where, $\theta_{d0}$ is an original joint position trajectory command, and h is a joint position trajectory compensation value, which may be calculated from a function of various parameters, such as center of gravity x of the robot, force f with respect to the ground, moment m with respect to the ground, zero moment point ZMP of the robot, and inclination angle $\phi$ of the robot.

$$h(x) = k_{px}(x_d - x) + k_{dx}(\dot{x}_d - \dot{x}) \qquad \text{Equation 4}$$

Equation 4 is an example of a joint position trajectory compensation value h(x).

The joint position trajectory compensation value h(x) is obtained by taking the product of a difference $x_d - x$ between a command value $x_d$ of the center of gravity of the robot and an actual value x of the center of gravity of the robot and a proportional gain $k_{px}$, taking the product of a difference $\dot{x}_d - \dot{x}$ between a velocity $\dot{x}_d$ of the center of gravity of the robot and an actual value $\dot{x}$ thereof and a derivative gain $k_{dx}$, and adding the products $k_{px}(x_d - x)$ and $k_{dx}(\dot{x}_d - \dot{x})$.

In addition, the joint position trajectory compensation value h may be calculated using at least one selected from a group consisting of other parameters, such as force f with respect to the ground, moment m with respect to the ground, zero moment point ZMP of the robot, and inclination angle $\phi$ of the robot.

The joint torque compensation value calculation unit 350 creates a joint torque compensation value to compensate for a joint torque command using a value measured by the sensor unit 330 and provides the created joint torque compensation value to the joint torque servo control unit 320. That is, when a foot of the robot lands on a ground, the joint torque compensation value calculation unit 350 may calculate a joint torque compensation value g based on force and moment information received from the multi-axis F/T sensor 24 and pose information of the robot received from the pose sensor 14.

The joint torque servo control unit 320 may calculate a joint torque according to a joint torque command $\tau_d$ compensated for as represented by Equation 5.

$$\tau_d = \tau_{d0} + g(x, f, m, ZMP, \phi) \qquad \text{Equation 5}$$

Where, $\tau_{d0}$ is an original joint torque command, and g is a joint torque compensation value, which may be calculated from a function of various parameters, such as center of gravity x of the robot, force f with respect to the ground, moment m with respect to the ground, zero moment point ZMP of the robot, and inclination angle $\phi$ of the robot.

$$g(x) = k'_{px}(x_d - x) + k'_{dx}(\dot{x}_d - \dot{x}) \qquad \text{Equation 6}$$

Equation 6 is an example of a joint torque compensation value g(x).

The joint torque compensation value g(x) is obtained by taking the product of a difference $x_d - x$ between a command value $x_d$ of the center of gravity of the robot and an actual value x of the center of gravity of the robot and a proportional gain $k'_{px}$, taking the product of a difference $\dot{x}_d-\dot{x}$ between a velocity $\dot{x}_d$ of the center of gravity of the robot and an actual value $\dot{x}$ thereof and a derivative gain and adding the products $k'_{px}(x_d-x)$ and $k'_{dx}(\dot{x}_d-\dot{x})$.

In addition, the joint torque compensation value g may be calculated using at least one selected from a group comprising of other parameters, such as force f with respect to the ground, moment m with respect to the ground, zero moment point ZMP of the robot, and inclination angle φ of the robot.

In this embodiment, both the joint position trajectory command and the joint torque command are compensated for. Alternatively, the joint position trajectory command or the joint torque command may be compensated for to achieve stable walking of the humanoid robot.

Hereinafter, a walking control method of the humanoid robot according to an embodiment will be described.

Figure 9:
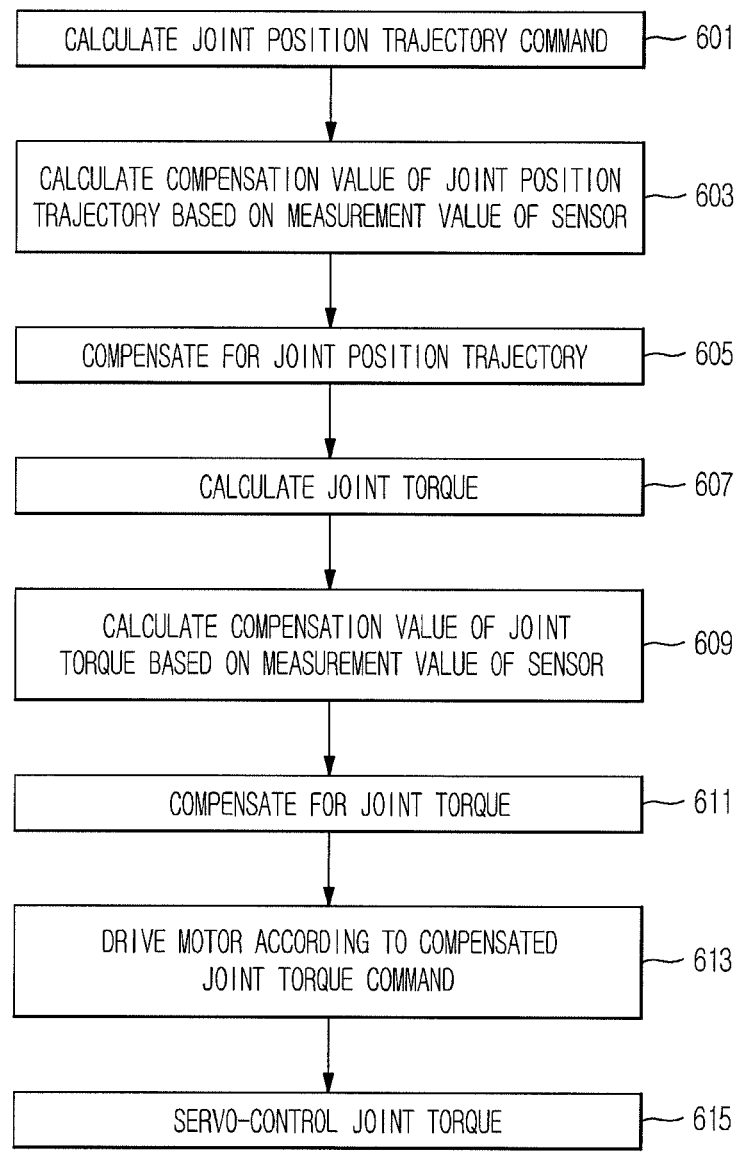
FIG. 9 is a flow chart illustrating a walking control method of a humanoid robot according to an embodiment.

Referring to FIG. 3 and FIG. 9, the humanoid robot 100 may walk based on an FSM. To perform a walking operation, the joint position trajectory calculator 303 determines the landing state of the left foot and the right foot using a measurement value of the sensor unit 300 to calculate a joint position trajectory command $θ_d$ of each joint of the robot joint unit 101 (601). As another example to create the joint position trajectory command $θ_d$, motion of a human may be captured, and motion of each joint may be sampled in a cycle, and joint positions of the humanoid robot are matched based on the sampling information to calculate the joint position trajectory command.

The calculated joint position trajectory command $θ_d$ is provide to the joint torque calculation unit 310.

The joint position trajectory compensation value calculation unit 340 calculates a joint position trajectory compensation value h, from the sensor unit 330, based on force and moment information received from the multi-axis F/T sensor 24 and pose information of the robot received from the pose sensor 14 (603). The joint position trajectory compensation value h may be calculated from a function of various parameters, such as center of gravity x of the robot, force f with respect to the ground, moment m with respect to the ground, zero moment point ZMP of the robot, and inclination angle φ of the robot.

The calculated joint position trajectory compensation value h is provided to the joint torque calculation unit 310. The joint torque calculation unit 310 adds the joint position trajectory compensation value h to an original joint position trajectory command $θ_{d0}$ to perform compensation (605) and calculates a joint torque according to a joint position trajectory command $θ_d$ compensated for as represented by Equation 3 (607).

The joint torque compensation value calculation unit 350 calculates a joint torque compensation value g, from the sensor unit 330, based on force and moment information received from the multi-axis F/T sensor 24 and pose information of the robot received from the pose sensor 14 (609). The joint torque compensation value g may be calculated from a function of various parameters, such as center of gravity x of the robot, force f with respect to the ground, moment m with respect to the ground, zero moment point ZMP of the robot, and inclination angle φ of the robot.

The calculated joint torque compensation value g is provided to the joint torque servo control unit 320. The joint torque servo control unit 320 adds the joint torque compensation value g to an original joint torque command $τ_{d0}$ to perform compensation (611) and drives the motor 405 mounted to each joint of the robot joint unit 101 according to a joint torque command $τ_d$ compensated for as represented by Equation 5 (613).

During driving of the motor, a joint torque value measured by the torque sensor 405b is fed back to the joint torque servo control unit 320, which drives the motor 405 through servo control to control motor current i such that the motor 405 follows the joint torque command $τ_d$ (615).

As is apparent from the above description, the humanoid robot and the walking control method thereof servo-control the motor torque through the FSM-based walking control. During walking, therefore, the position of each joint may not be correctly controlled, thereby achieving walking with a low servo gain, thus reducing energy consumption, Also, each joint has low rigidity during walking, and therefore, impact applied to each joint is reduced upon collision with obstacles. In addition, knee-stretching walking, which is difficult in a conventional walking method solving inverse kinematics, is performed, thereby achieving human-friendly walking and saving energy related to knee bending. Also, complex dynamics may not be solved, thereby achieving application to a robot including joints having six degrees of freedom.

The above-described embodiments may be recorded in non-transitory computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A humanoid robot comprising:
   a robot joint unit comprising joints movable during walking of the robot;
   a sensor unit to measure landing information and pose information of the robot;
   a joint position trajectory creation unit to create a joint position trajectory of each joint using the landing information and the pose information of the robot;

a joint position trajectory compensation value calculation unit to calculate a joint position trajectory compensation value to compensate for the joint position trajectory of each joint;

a joint torque calculation unit to compensate for the joint position trajectory of each joint using the joint position trajectory compensation value and to calculate a joint torque command of each joint according to the compensated joint position trajectory of each joint;

a joint torque compensation value calculation unit to calculate a joint torque compensation value to compensate for the joint torque of each joint; and a joint torque servo control unit to compensate for the joint torque command of each joint using the joint torque compensation value, to calculate a motor current to follow the compensated joint torque command of each joint, and to control a motor mounted to each joint according to the calculated motor current, wherein the joint torque servo control unit comprises a motor controller and a torque sensor for each motor mounted to each joint to measure a torque of each motor mounted to each joint, and wherein the joint servo control unit calculates the motor current of each motor mounted to each joint based, in part, on subtracting the measured torque of each motor mounted to each joint from the joint torque command of each joint.

2. The humanoid robot according to claim 1, wherein the sensor unit comprises a multi-axis force and torque (F/T) sensor to measure landing of the robot and a pose sensor to measure pose of the robot, wherein the pose sensor is mounted in an upper body of the humanoid robot, and wherein the joint torque compensation value calculation unit to calculate the joint torque compensation value, using the landing information and the pose information from the sensor unit, to compensate for the joint torque of each joint.

3. The humanoid robot according to claim 1, wherein the joint position trajectory creation unit comprises a plurality of state machines alternately operating when a left foot or a right foot lands on a ground and a joint position trajectory calculator to determine landing of the left foot or the right foot according to switching between the state machines to calculate a joint position trajectory command of each joint.

4. The humanoid robot according to claim 1, wherein the joint torque calculation unit, comprising first to third position operators, a proportional gain controller, and a derivative gain controller, calculates a joint torque command $\tau_d$ of each joint as represented by Equation 1, $$\tau_d = k_p(\theta_d - \theta) + k_d(\dot{\theta}_d - \dot{\theta}) + \tau_{\!f\!f} \qquad \text{Equation 1}$$

the first position operator outputs a subtracted value $\theta_d - \theta$ obtained by subtracting a current joint position 9 fed back from the motor from a joint position trajectory command $\theta_d$, the proportional gain controller outputs a multiplied value $k_p(\theta_d - \theta)$ obtained by multiplying the subtracted value $\theta_d - \theta$ by a proportional gain $k_p$ to the second position operator, the third position operator outputs a subtracted value $\dot{\theta}_d - \dot{\theta}$ obtained by subtracting a derived current joint position $\dot{\theta}$ from a derived joint position trajectory command $\dot{\theta}_d$ to the derivative gain controller, the derivative gain controller outputs a multiplied value $k_d(\dot{\theta}_d - \dot{\theta})$ obtained by multiplying the subtracted value $\dot{\theta}_d - \dot{\theta}$ by a derivative gain $k_d$ to the second position operator, and the second position operator adds a feed-forward parameter $\tau_{\!f\!f}$ previously calculated using inverse dynamics to the multiplied values $k_p(\theta_d - \theta)$ and $k_d(\dot{\theta}_d - \dot{\theta})$ to output the joint torque command $\tau_d$ of each joint.

5. The humanoid robot according to claim 4, wherein the sensor unit further comprises an encoder mounted to the motor to measure the current joint position $\theta$.

6. The humanoid robot according to claim 1, wherein the motor controller, comprising first to third torque operators, a proportional gain controller, an integrator, a integral gain controller, and a derivative gain controller, calculates motor current i as represented by Equation 2, $$i = k_p(\tau_d - \tau) + k_d(\dot{\tau}_d - \dot{\tau}) + k_i\!\int(\tau_d - \tau)dt + i_{\!f\!f} \qquad \text{Equation 2}$$

the first torque operator outputs a subtracted value $\tau_d - \tau$ obtained by subtracting a current motor torque $\tau$ fed back from the torque sensor from a joint torque command $\tau_d$, the proportional gain controller outputs a multiplied value $k_p(\tau_d - \tau)$ obtained by multiplying the subtracted value $\tau_d - \tau$ by a proportional gain $k_p$ to the second torque operator, the integrator integrates and outputs the subtracted value $\tau_d - \tau$ to the integral gain controller, the integral gain controller outputs a multiplied value $k_i\!\int(\tau_d - \tau)$ obtained by multiplying the integrated subtracted value $\int(\tau_d - \tau)$ by an integral gain $k_i$ to the second torque operator, the third torque operator outputs a subtracted value $\dot{\tau}_d - \dot{\tau}$ obtained by subtracting a derived current motor torque $\dot{\tau}$ from a derived joint torque command $\dot{\tau}_d$ to the derivative gain controller, the derivative gain controller outputs a multiplied value $k_d(\dot{\tau}_d - \dot{\tau})$ obtained by multiplying the subtracted value $\dot{\tau}_d - \dot{\tau}$ by a derivative gain $k_d$ to the second torque operator, and the second torque operator adds a feed-forward parameter $i_{\!f\!f}$ previously calculated using inverse dynamics to the multiplied values $k_p(\tau_d - \tau)$, $k_d(\dot{\tau}_d - \dot{\tau})$ and $k_i\!\int(\tau_d - \tau)$ to output the motor current i.

7. The humanoid robot according to claim 1, wherein the sensor unit comprises a multi-axis F/T sensor to measure landing of the robot and a pose sensor to measure pose of the robot, the joint position trajectory compensation value calculation unit calculates a joint position trajectory compensation value h based on force and moment information received from the multi-axis F/T sensor and pose information of the robot received from the pose sensor when a foot of the robot lands on a ground, and the joint torque calculation unit calculates a joint torque according to a joint position trajectory command $\theta_d$ compensated for as represented by Equation 3 using the joint position trajectory compensation value h, $$\theta_d = \theta_{d0} + h(x, f, m, \text{ZMP}, \phi)$$

Where, $\theta_{d0}$ is an original joint position trajectory command, and the joint position trajectory compensation value h is calculated from a function of one selected from various parameters comprising center of gravity x of the robot, force f with respect to the ground, moment m with respect to the ground, zero moment point ZMP of the robot, and inclination angle $\phi$ of the robot.

8. The humanoid robot according to claim 7, wherein the joint position trajectory compensation value is calculated as represented by Equation 4, $$h(x) = k_{px}(x_d - x) + k_{dx}(\dot{x}_d - \dot{x})$$  Equation 4

Where, $x_d$ is a command value of the center of gravity of the robot, x is an actual value of the center of gravity of the robot, $k_{px}$ is a proportional gain, $\dot{x}_d$ is a velocity of the center of gravity of the robot, $\dot{x}$ is an actual value of the velocity of the center of gravity of the robot, and $k_{dx}$ a derivative gain.

9. The humanoid robot according to claim 1,
wherein the sensor unit comprises a multi-axis F/T sensor to measure landing of the robot and a pose sensor to measure pose of the robot,
the joint torque compensation value calculation unit calculates a joint torque compensation value g based on force and moment information received from the multi-axis F/T sensor and pose information of the robot received from the pose sensor when a foot of the robot lands on a ground, and
the joint torque servo control unit calculates a joint torque according to a joint torque command $\tau_d$ compensated for as represented by Equation 5, $$\tau_d = \tau_{d0} + g(x, f, m, ZMP, \phi)$$  Equation 5

Where, $\tau_{d0}$ is an original joint torque command, and the joint torque compensation value g is calculated from a function of one selected from various parameters comprising center of gravity x of the robot, force f with respect to the ground, moment m with respect to the ground, zero moment point ZMP of the robot, and inclination angle $\phi$ of the robot.

10. The humanoid robot according to claim 9, wherein the joint torque compensation value is calculated as represented by Equation 6, $$g(x) = k'_{px}(x_d - x) + k'_{dx}(\dot{x}_d - \dot{x})$$  Equation 6

Where, $x_d$ is a command value of the center of gravity of the robot, x is an actual value of the center of gravity of the robot, $k'_{px}$ is a proportional gain, $\dot{x}_d$ is a velocity of the center of gravity of the robot, $\dot{x}$ is an actual value of the velocity of the center of gravity of the robot, and $k'_{dx}$ is a derivative gain.

11. A walking control method of a humanoid robot, comprising:
calculating a joint position trajectory of each joint to perform walking of the robot using a joint position trajectory creation unit;
calculating a joint position trajectory compensation value to compensate for the joint position trajectory of each joint using landing information and pose information of the robot measured by a sensor unit mounted in the robot using a joint position trajectory compensation value calculation unit;
calculating a joint torque command of each joint according to the joint position trajectory compensated for using the joint position trajectory compensation value using a joint torque calculation unit;
calculating a joint torque compensation value to compensate for the joint torque command of each joint using the landing information and the pose information of the robot measured by the sensor unit mounted in the robot using joint torque compensation value calculation unit;
calculating motor current to follow the joint torque command compensated for using the joint torque compensation value and controlling a motor mounted to each joint according to the calculated motor current using a joint torque servo control unit; and
measuring torque of each motor mounted on each joint using a torque sensor for each motor mounted on each joint,
wherein the calculated motor current is based, in part, on subtracting the measured torque of each motor mounted to each joint from the joint torque command of each joint.

12. The walking control method according to claim 11, wherein calculating the joint position trajectory comprises determining landing of a left foot or a right foot on a ground to calculate a joint position trajectory command of each joint.

13. The walking control method according to claim 11, wherein calculating the joint torque of each joint comprises outputting a subtracted value $\theta_d - \theta$ obtained by subtracting a current joint position $\theta$ from a joint position trajectory command $\theta_d$ of each joint, outputting a multiplied value $k_p(\theta_d - \theta)$ obtained by multiplying the subtracted value $\theta_d - \theta$ by a proportional gain $k_p$, outputting a subtracted value $\dot{\theta}_d - \dot{\theta}$ obtained by subtracting a derived current joint position $\dot{\theta}$ from a derived joint position trajectory command $\dot{\theta}_d$, outputting a multiplied value $k_d(\dot{\theta}_d - \dot{\theta})$ obtained by multiplying the subtracted value $\dot{\theta}_d - \dot{\theta}$ by a derivative gain $k_d$, and adding a feed-forward parameter $\tau_{ff}$ previously calculated using inverse dynamics to the multiplied values $k_p(\theta_d - \theta)$ and $k_d(\dot{\theta}_d - \dot{\theta})$ to output a joint torque command $\tau_d$ of each joint.

14. The walking control method according to claim 11, wherein calculating the motor current comprises outputting a subtracted value $\tau_d - \tau$ obtained by subtracting a current motor torque $\tau$ from a joint torque command $\tau_d$, outputting a multiplied value $k_p(\tau_d - \tau)$ obtained by multiplying the subtracted value $\tau_d - \tau$ by a proportional gain $k_p$, integrating the subtracted value $\tau_d - \tau$, outputting a multiplied value $k_i \int(\tau_d - \tau)$ obtained by multiplying the integrated subtracted value $\int(\tau_d - \tau)$ by an integral gain $k_i$, outputting a subtracted value $\dot{\tau}_d - \dot{\tau}$ obtained by subtracting a derived current motor torque $\dot{\tau}$ from a derived joint torque command $\dot{\tau}_d$, outputting a multiplied value $k_d(\dot{\tau}_d - \dot{\tau})$ obtained by multiplying the subtracted value $\dot{\tau}_d - \dot{\tau}$ by a derivative gain $k_d$, and adding a feed-forward parameter $i_{ff}$ previously calculated using inverse dynamics to the multiplied values $k_p(\tau_d - \tau)$, $k_d(\dot{\tau}_d - \dot{\tau})$ and $k_i \int(\tau_d - \tau)$ to output motor current i.

15. The walking control method according to claim 11, further comprising:
calculating the joint position trajectory compensation value based on force and moment information received from a multi-axis F/T sensor to measure landing of the robot and pose information of the robot received from a pose sensor to measure pose of the robot, wherein
the joint position trajectory compensation value h is calculated from a function of one selected from various parameters comprising center of gravity x of the robot, force f with respect to the ground, moment m with respect to the ground, zero moment point ZMP of the robot, and inclination angle $\phi$ of the robot, and
the compensated joint position trajectory command $\theta_d$ is obtained by adding the calculated joint position trajectory compensation value h to an original joint position trajectory command $\theta_{d0}$.

16. The walking control method according to claim 11, further comprising:
calculating the joint torque compensation value based on force and moment information received from a multi-axis F/T sensor to measure landing of the robot and pose information of the robot received from a pose sensor to measure pose of the robot, wherein the joint torque compensation value g is calculated from a function of one selected from various parameters comprising center of gravity x of the robot, force f with respect to the ground, moment m with respect to the ground, zero moment point ZMP of the robot, and inclination angle $\phi$ of the robot, and the compensated joint torque command $\tau_d$ is obtained by adding the calculated joint torque compensation value g to an original joint torque command $\tau_{d0}$.

17. At least one non-transitory computer readable medium comprising computer readable instructions that control at least one processor to implement the method of claim 11.

* * * * *

UNITED STATES PATENT AND TRADEMARK OFFICE
CERTIFICATE OF CORRECTION

PATENT NO. : 8,676,381 B2  Page 1 of 1
APPLICATION NO. : 13/006782
DATED : March 18, 2014
INVENTOR(S) : Kwon et al.

It is certified that error appears in the above-identified patent and that said Letters Patent is hereby corrected as shown below:

On the Title Page Item [75] (Inventors), Line 2, delete "Suweon-si (KR);" and insert -- Suwon-si (KR); --, therefor.
On the Title Page Item [75] (Inventors), Line 6, delete "Hyang" and insert -- Hyung --, therefor.

In the Claims

Column 13, Lines 56-57, In Claim 4, delete "$\theta_d$-$\theta$obtained" and insert -- $\theta_d$-$\theta$ obtained --, therefor.
Column 13, Line 57, In Claim 4, delete "9" and insert -- $\theta$ --, therefor.
Column 14, Line 60, In Claim 7, after "$\theta_d=\theta_{d0}+h(x,f,mZMP,\Phi)$" insert -- Equation 3 --.
Column 15, Line 10, In Claim 8, after "$k_{dx}$" insert -- is --.
Column 16, Line 26, In Claim 13, delete "  " and insert -- $k_p(\theta_d-\theta)$ --, therefor.

Signed and Sealed this
Eighteenth Day of November, 2014

Michelle K. Lee
*Deputy Director of the United States Patent and Trademark Office*